(12) United States Patent
Wang et al.

(10) Patent No.: US 11,238,272 B2
(45) Date of Patent: Feb. 1, 2022

(54) METHOD AND APPARATUS FOR DETECTING FACE IMAGE

(71) Applicant: Baidu Online Network Technology (Beijing) Co., Ltd., Beijing (CN)

(72) Inventors: Yang Wang, Beijing (CN); Yan Liu, Beijing (CN); Junfeng Xiong, Beijing (CN); Xin Hao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/701,982

(22) Filed: Dec. 3, 2019

(65) Prior Publication Data

US 2020/0394392 A1    Dec. 17, 2020

(30) Foreign Application Priority Data

Jun. 14, 2019   (CN) .......................... 201910517338.7

(51) Int. Cl.
*G06K 9/00*        (2006.01)
(52) U.S. Cl.
CPC ..... *G06K 9/00295* (2013.01); *G06K 9/00248* (2013.01); *G06K 9/00255* (2013.01)
(58) Field of Classification Search
CPC .......... G06K 9/00295; G06K 9/00248; G06K 9/00255; G06K 9/00281; G06K 9/00711;
(Continued)

(56) References Cited

U.S. PATENT DOCUMENTS

2002/0030318 A1   3/2002   Hoshiyama
2018/0032828 A1*  2/2018   Wang ................. G06K 9/00288
(Continued)

FOREIGN PATENT DOCUMENTS

CN   105205455   12/2015
CN   105205482   12/2015
(Continued)

OTHER PUBLICATIONS

Yang, et al., Exposing Deep Fakes Using Inconsistent Head Poses, arXiv:1811.00661v2[cs.CV] Nov. 13, 2018.
(Continued)

*Primary Examiner* — Nimesh Patel
(74) *Attorney, Agent, or Firm* — Knobbe, Martens, Olson & Bear LLP

(57) ABSTRACT

Embodiments of the present disclosure provide a method and apparatus for detecting a face image, electronic device, and computer readable medium. The method may include: performing facial keypoint detection on an image frame containing a face object; segmenting a center face area image and an entire face area image of a target face object from the image frame based on a facial keypoint detection result; performing head pose estimation respectively based on the center face area image and the entire face area image; and generating a detection result on whether the target face object contained in the image frame is a fake face object based on a difference between a piece of first head pose information estimated based on the center face area image and a piece of second head pose information estimated based on the entire face area image.

15 Claims, 4 Drawing Sheets

(58) Field of Classification Search
CPC ........... G06K 9/00228; G06K 9/00677; G06K 9/00013; G06K 9/00221; G06K 9/00335; G06K 9/00369; G06K 9/00778; G06K 9/00302; G06K 9/00771; G06K 9/4642; G06K 9/00785; G06K 9/627; G06K 9/6215; G06K 9/6277; G06K 2209/05; G06K 9/6212; G06K 9/9267; G06K 9/00214; G06K 9/00268; G06K 9/00744; G06K 9/20; G06K 9/00597; G06K 9/0061; G06Q 50/01; G06Q 10/10; G06Q 30/0261; G06Q 10/02; G06Q 30/02; G06Q 30/0601; G06Q 10/00; G06Q 30/0207; G06Q 20/0453; G06Q 20/3278; G06Q 20/40145; G06Q 30/0258; G06Q 30/0259; G06Q 30/0267; G06Q 20/4014; G06Q 20/32; G06Q 50/22; G06Q 50/265; G06Q 30/0643; G06Q 10/1097; H04L 43/08; H04L 43/04; H04L 63/0861; H04L 67/02; H04L 63/107; H04L 63/102; H04L 63/10; H04L 63/0892; H04L 63/12; H04L 2209/80; H04L 63/108; H04L 9/3231; Y02D 70/1262; Y02D 70/144; Y02D 70/146; Y02D 70/164; Y02D 70/22; Y02D 70/1242; Y02D 70/1222; Y02D 10/24; Y02D 70/26; Y02D 70/23; H04W 4/21; H04W 4/02; H04W 4/023; H04W 4/029; H04W 4/021; H04W 52/0254; H04W 4/027; H04W 12/06; H04W 64/00; H04W 52/0258; H04W 12/08; H04W 4/025; H04W 52/0225; H04W 12/12; H04W 8/16; H04W 88/02; G06F 3/0482; G06F 2221/2111; G06F 2201/805; G06F 21/88; G06F 21/32; G06F 21/31; G06F 21/554; G06F 2221/2149; G06F 21/50; G01S 2205/006; G01S 2205/008; G01S 5/0009; G01S 5/0018; G01S 5/0054; G01S 19/17; G01S 5/0231; G06T 7/73; G06T 2207/20104; G06T 2207/10024; G06T 7/11; G06T 2200/24; G06T 17/00; G06T 2200/04; G06T 2207/30196; G06T 2207/30041; G06T 2207/30201; G06T 5/50; G06T 7/33; G06T 7/593; G06T 2207/30244; G06T 2210/12; G06T 3/0068; G08B 13/1963; G08B 21/10; G08B 13/00; G08B 13/1961; G08B 13/19641; G08B 13/19697; G08B 25/006; G08B 25/08; G08B 25/14; G06N 3/0454; G06N 3/08; G06N 5/003; G06N 3/04; G06N 3/006; G06N 3/0445; G06N 20/20
See application file for complete search history.

(56) References Cited

U.S. PATENT DOCUMENTS

| | | | | |
|---|---|---|---|---|
| 2018/0046855 | A1* | 2/2018 | Ganong | G06K 9/00248 |
| 2019/0266388 | A1* | 8/2019 | Kolagunda | G06K 9/00208 |
| 2019/0318156 | A1* | 10/2019 | Wu | G06T 7/80 |
| 2020/0097767 | A1* | 3/2020 | Perry | G06K 9/00281 |
| 2021/0004587 | A1* | 1/2021 | Xiong | G06K 9/4609 |

FOREIGN PATENT DOCUMENTS

| | | |
|---|---|---|
| CN | 105844276 | 8/2016 |
| CN | 107564080 | 1/2018 |
| CN | 108229328 | 6/2018 |

OTHER PUBLICATIONS

Zhong, Qianli, Automatic Face Replacement in Images, A Master Thesis Submitted to University of Electronic Science and Technology of China, School of Automation Engineering 2016.
Proceedings of the 14th National Conference on Neural Networks, IEEE Computational Intelligence Society Beijing Chapter, Oct. 27-29, 2004.

* cited by examiner

METHOD AND APPARATUS FOR DETECTING FACE IMAGE

CROSS-REFERENCE TO RELATED APPLICATION

This application claims priority to Chinese Patent Application No. 201910517338.7, filed on Jun. 14, 2019, titled "Method and apparatus for detecting face image," which is hereby incorporated by reference in its entirety.

TECHNICAL FIELD

Embodiments of the present disclosure relate to the field of computer technology, specifically to the field of artificial intelligence technology, and more specifically to a method and apparatus for detecting a face image.

BACKGROUND

The face swap technology is a technology of replacing a human face in images or videos, and generally automatically replaces a face of a person in the images or videos with a face of another person using an artificial intelligence technology. The images or videos may not be accurately identified by human eyes. This technology, if being improperly used, will result in portraiture right violations, spread false news, and cause serious consequences, such as public events.

SUMMARY

Embodiments of the present disclosure provide a method and apparatus for detecting a face image, an electronic device and a computer readable medium.

In a first aspect, an embodiment of the present disclosure provides a method for detecting a face image, including: performing facial keypoint detection on an image frame containing a face object; segmenting a center face area image and an entire face area image of a target face object from the image frame based on a facial keypoint detection result, the center face area image being a face image excluding a fringe face area, and the entire face area image being a face image containing the fringe face area; performing head pose estimation respectively based on the center face area image and the entire face area image; and generating a detection result on whether the target face object contained in the image frame is a fake face object based on a difference between a piece of first head pose information estimated based on the center face area image and a piece of second head pose information estimated based on the entire face area image.

In some embodiments, the generating a detection result on whether the target face object contained in the image frame is a fake face object based on a difference between a piece of first head pose information estimated based on the center face area image and a piece of second head pose information estimated based on the entire face area image includes: determining the target face object being the fake face object, in response to determining that the difference between the piece of first head pose information and the piece of second head pose information corresponding to a target face object contained in a plurality of consecutive image frames of a video exceeds a preset difference range.

In some embodiments, the piece of first head pose information includes a first head pose angle vector, and the piece of second head pose information includes a second head pose angle vector; and the generating a detection result on whether the target face object contained in the image frame is a fake face object based on a difference between a piece of first head pose information estimated based on the center face area image and a piece of second head pose information estimated based on the entire face area image includes: computing a deviation between the first head pose angle vector and the second head pose angle vector; and determining, in response to determining that the deviation between the first head pose angle vector and the second head pose angle vector is greater than a preset threshold, the target face object contained in the image frame being the fake face object.

In some embodiments, the segmenting a center face area image and an entire face area image of a target face object from the image frame based on a facial keypoint detection result includes: determining a boundary of the center face area based on positions of keypoints of five sense organs in the facial keypoint detection result; and segmenting an image area within the boundary of the center face area from the image frame for use as the center face area image.

In some embodiments, the segmenting a center face area image and an entire face area image of a target face object from the image frame based on a facial keypoint detection result further includes: expanding the boundary of the center face area outward by a preset range, for use as a boundary of the entire face area; and segmenting a corresponding image area from the image frame based on the boundary of the entire face area, for use as the entire face area image.

In some embodiments, the segmenting a center face area image and an entire face area image of a target face object from the image frame based on a facial keypoint detection result further includes: determining a boundary of the entire face area based on positions of fringe facial keypoints in the facial keypoint detection result; and segmenting a corresponding image area from the image frame based on the boundary of the entire face area, for use as the entire face area image.

In a second aspect, an embodiment of the present disclosure provides an apparatus for detecting a face image, including: a detecting unit configured to perform facial keypoint detection on an image frame containing a face object; a segmenting unit configured to segment a center face area image and an entire face area image of a target face object from the image frame based on a facial keypoint detection result, the center face area image being a face image excluding a fringe face area, and the entire face area image being a face image containing the fringe face area; an estimating unit configured to perform head pose estimation respectively based on the center face area image and the entire face area image; and a generating unit configured to generate a detection result on whether the target face object contained in the image frame is a fake face object based on a difference between a piece of first head pose information estimated based on the center face area image and a piece of second head pose information estimated based on the entire face area image.

In some embodiments, the generating unit is further configured to: determine the target face object being the fake face object, in response to determining that the difference between the piece of first head pose information and the piece of second head pose information corresponding to a target face object contained in a plurality of consecutive image frames of a video exceeds a preset difference range.

In some embodiments, the piece of first head pose information includes a first head pose angle vector, and the piece of second head pose information includes a second head pose angle vector; and the generating unit is further configured to: compute a deviation between the first head pose angle vector and the second head pose angle vector; and determine, in response to determining that the deviation between the first head pose angle vector and the second head pose angle vector is greater than a preset threshold, the target face object contained in the image frame being the fake face object.

In some embodiments, the segmenting unit is further configured to segment the center face area image from the image frame by: determining a boundary of the center face area based on positions of keypoints of five sense organs in the facial keypoint detection result; and segmenting an image area within the boundary of the center face area from the image frame for use as the center face area image.

In some embodiments, the segmenting unit is further configured to segment the entire face area image from the image frame by: expanding the boundary of the center face area outward by a preset range, for use as a boundary of the entire face area; and segmenting a corresponding image area from the image frame based on the boundary of the entire face area, for use as the entire face area image.

In some embodiments, the segmenting unit is further configured to segment the entire face area image from the image frame by: determining a boundary of the entire face area based on positions of fringe facial keypoints in the facial keypoint detection result; and segmenting a corresponding image area from the image frame based on the boundary of the entire face area, for use as the entire face area image.

In a third aspect, an embodiment of the present disclosure provides an electronic device, including: one or more processors; and a storage apparatus configured to store one or more programs, where the one or more programs, when executed by the one or more processors, cause the one or more processors to implement the method for detecting a face image according the first aspect.

In a fourth aspect, an embodiment of the present disclosure provides a computer readable medium, storing a computer program thereon, where the program, when executed by a processor, implements the method for detecting a face image according the first aspect.

The method and apparatus for detecting a face image, electronic device and computer readable medium according to the above embodiments of the present disclosure, perform facial keypoint detection on an image frame containing a face object, segment a center face area image and an entire face area image of a target face object from the image frame based on a facial keypoint detection result, the center face area image being a face image excluding a fringe face area, and the entire face area image being a face image containing the fringe face area, perform head pose estimation respectively based on the center face area image and the entire face area image, and generate a detection result on whether the target face object contained in the image frame is a fake face object based on a difference between a piece of first head pose information estimated based on the center face area image and a piece of second head pose information estimated based on the entire face area image, to detect "face swap" using a characteristic that face fringe is stiff after face swap because it is difficult to replace the face fringe, thus effectively detecting a fake face image generated through face swap in an image or video, thereby improving detection accuracy.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
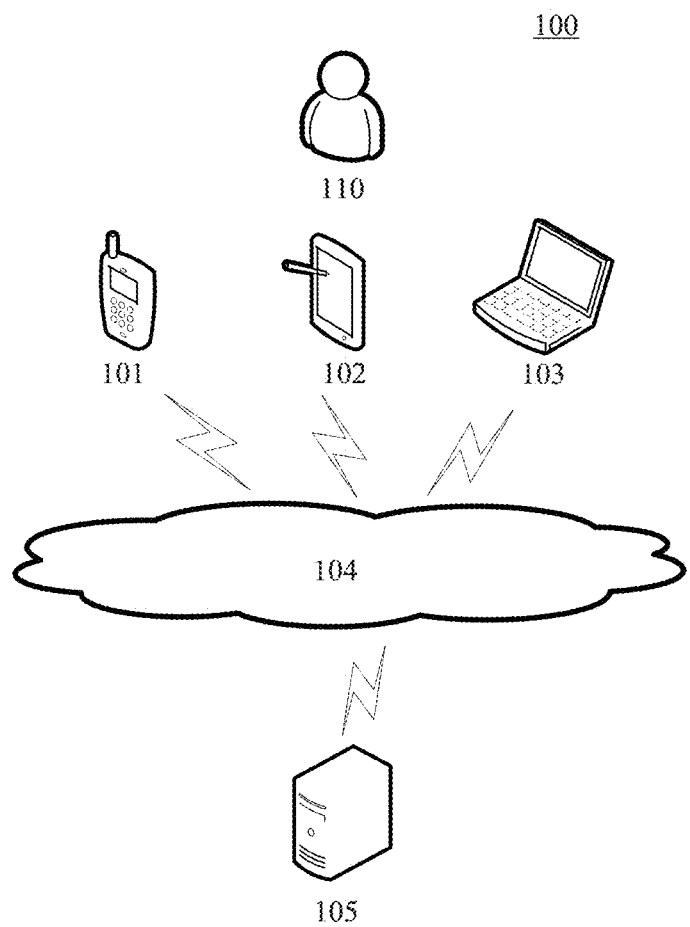
FIG. 1 is an architectural diagram of an example system in which some embodiments of the present disclosure may be implemented.

FIG. 1 shows an example system architecture in which a method for detecting a face image or an apparatus for detecting a face image according to some embodiments of the present disclosure may be applied.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network may include various types of connections, such as wired or wireless communication links, or optical cables.

The terminal devices 101, 102, and 103 may be an electronic device having a display screen, and may be a smartphone, a notebook computer, a desktop computer, a tablet computer, a smart watch, and the like. The terminal devices 101, 102, and 103 may be provided with various network resource applications, such as an audio/video playing application, an information client side, and a browser application. A user may use the terminal devices 101, 102, and 103 to access network resources, and browse images, videos, and so on in the network.

The server 105 may provide back-end support for contents displayed on the terminal devices 101, 102, and 103. The server 105 may receive a resource access request or data analysis request sent by the terminal devices 101, 102, and 103 via the network 104, find related resources, or obtain a processing result by data analysis and processing, and return the processing result to the terminal devices 101, 102, and 103.

In an application scenario of some embodiments of the present disclosure, the server 105 may provide a service of identifying authenticity of a face image/video. The server 105 may identify whether a human face in the image or video received from the terminal devices 101, 102, and 103, or other servers, or found out from a database is a synthetic human face generated through a face swap operation. The server 105 may return the identifying result to the terminal devices 101, 102, and 103, and the user may know the identifying result via the terminal devices 101, 102, and 103.

In some scenarios, the terminal devices 101, 102, and 103 may alternatively perform a process of identifying the authenticity of the face image/video, to identify whether the human face in the image or video is the synthetic human face generated through the face swap operation.

It should be noted that the server 105 may be hardware or software. When the server 105 is hardware, the server may be implemented as a distributed server cluster composed of a plurality of servers, or be implemented as a single server. When the server 105 is software, the server may be implemented as a plurality of software programs or software modules (e.g., a plurality of software programs or software modules for providing distributed services), or be implemented as a single software program or software module. This is not specifically limited here.

The terminal devices 101, 102, and 103 may alternatively be software. When the terminal devices 101, 102, and 103 are software, the terminal devices may be installed in the above-listed electronic devices, may be implemented as a plurality of software programs or software modules (e.g., software programs or software modules configured to provide distributed services), or may be implemented as a single software program or software module. This is not specifically limited here.

It should be noted that the method for detecting a face image according to some embodiments of the present disclosure may be executed by the terminal devices 101, 102, and 103, or by the server 105. Accordingly, the apparatus for detecting a face image may be provided in the terminal devices 101, 102, and 103, or in the server 105.

It should be understood that the numbers of terminal devices, networks, and servers in FIG. 1 are merely illustrative. Any number of terminal devices, networks, and servers may be provided based on actual requirements.

Figure 2:
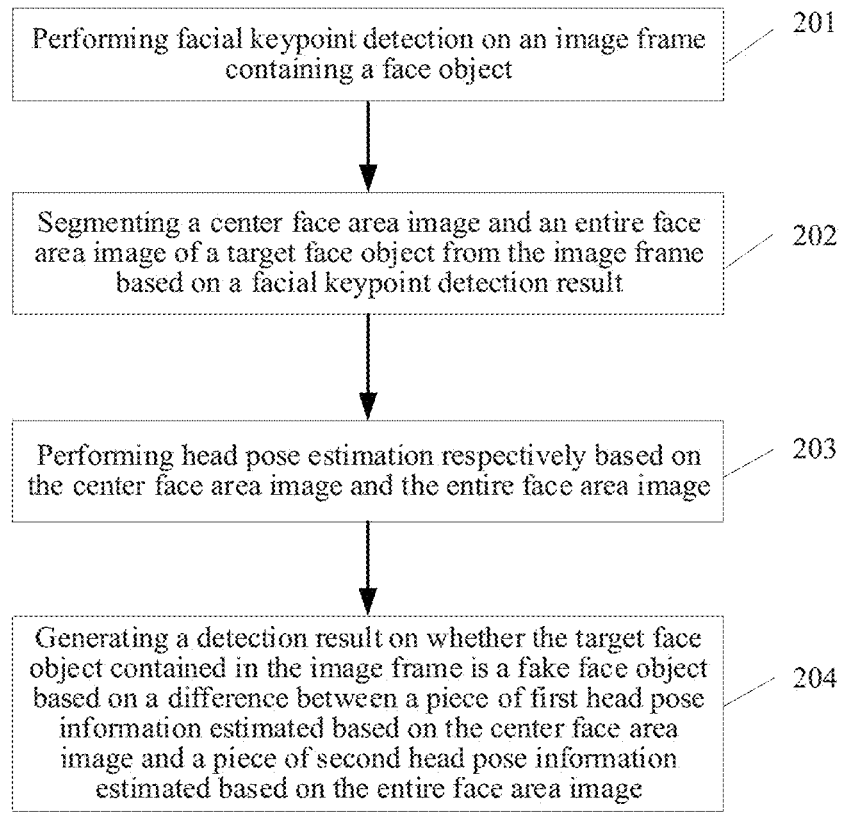
FIG. 2 is a flowchart of a method for detecting a face image according to an embodiment of the present disclosure.

Further referring to FIG. 2, a process 200 of a method for detecting a face image according to an embodiment of the present disclosure is shown. The method for detecting a face image includes the following steps.

Step 201: performing facial keypoint detection on an image frame containing a face object.

In the present embodiment, an executing body (e.g., the server shown in FIG. 1) of the method for detecting a face image may acquire the image frame containing the face object, for use as a to-be-detected face image. The executing body may extract the image frame containing the face object from a video, or acquire the image frame containing the face object in a to-be-detected video transmitted by other electronic devices, for use as a to-be-detected image frame. The executing body may actively acquire the image frame containing the face object, or receive an image frame containing a face object specified in an image identification request submitted by a user.

In practice, the user may initiate a request for identifying whether the face image or video is a fake face image or video generated through face swap technology to a terminal device, and upload a to-be-identified face image or video. The executing body may use the uploaded face image as a to-be-detected image frame, or extract one or more image frames from the uploaded face video for use as the to-be-detected image frame(s).

After acquiring the image frame containing the face object, facial keypoint detection may be performed. A facial keypoint may be a point characterizing features of a key facial part, and may include points characterizing features, such as positions or shapes of five sense organs or contours, or may further include points characterizing features, such as cheekbones, dimples, or other key facial attributes.

Alternatively, the facial keypoint may include points on contours (such as canthi, angulus oris, and brow ridges) of key parts, such as eyes, nose, lips, and eyebrows.

Various methods may be employed for facial keypoint detection, to locate positional coordinates of the facial keypoint. For example, a face model may be established and matched using an ASM (Active Shape Model) and an AAM (Active Appearance Model), based on constraints of features, such as shapes and the texture, of the five sense organs. For another example, a method based on a neural network may be employed, and a facial keypoint detection model may be trained based on a sample face image annotated with keypoints for detection, and so on.

Step 202: segmenting a center face area image and an entire face area image of a target face object from the image frame based on a facial keypoint detection result.

In some embodiments, if it is detected that there is only one face object in the image frame, then the face object may be used as the target face object; and if it is detected that there are two or more face objects in the image frame, then one of the face objects may be selected randomly for use as the target face object, or a user-selected face object may be used as the target face object.

Alternatively, if the image frame contains two or more face objects, first, an image of the target face object may be segmented from the image frame for subsequent processing.

A boundary of a center face area of the target face object in the image frame may be determined based on the facial keypoint detection result, to further segment the center face area image from the image frame. Here, the center face area image is a face image excluding a fringe face area, and the entire face area image is a face image containing the fringe face area.

The center face area may be an area containing keypoints of center parts, such as eyes, lips, and nose. The center face area image may be generated by dividing a connected area containing the keypoints of the center parts from the image frame. The center face area may be a regular rectangular or round area, or an irregular area.

The entire face area contains the center face area and the fringe face area. Keypoints, such as contour points of jaw, forehead, or the like, characterizing fringe face features may be extracted from the facial keypoints, and an image area containing the center face area and all keypoints characterizing the fringe face features may be divided from the image frame, for use as the entire face area image.

In some alternative implementations of the present embodiment, first, the boundary of the center face area may be determined based on positions of keypoints of the five sense organs in the facial keypoint detection result, and then an image area within the boundary of the center face area may be segmented from the image frame, for use as the center face area image.

Specifically, boundary coordinates of eyes, lips, eyebrows, and nose may be determined based on positional coordinates of detected keypoints of the five sense organs, such as the eyes, lips, eyebrows, and nose, e.g., coordinates of outer canthus, coordinates of brow ridge and eyebrow tail, and coordinates of lower edges of the lips are determined, and then a minimum bounding rectangle containing the five sense organs delimited based on the boundaries of the five sense organs is used as the boundary of the center face area. Then, the image area within the boundary of the center face area may be segmented from the image frame for use as the center face area image.

Further, the entire face area image may be segmented from the image frame as follows: expanding the boundary of the center face area outward by a preset range, for use as a boundary of the entire face area. The preset range may be related to a size of the center face area, for example, 1.5 times as much as the area; or may be a predetermined range, e.g., 100-unit lengths. In a specific example, coordinates of points on the boundary after expanding by the preset range may be computed with the center of the center face area as the center, with a boundary of an area that is 1.5 times as much as the area/radius/side length of the center face area as the boundary of the entire face area, based on coordinates of boundary points of the center face area (e.g., coordinates of four vertexes of a rectangle). Then, a corresponding image area may be segmented from the image frame based on the boundary of the entire face area, for use as the entire face area image.

Alternatively, in a further implementation, the entire face area image may be segmented from the image frame as follows: determining the boundary of the entire face area based on positions of fringe facial keypoints in the facial keypoint detection result, e.g., determining coordinates of vertexes of a minimum bounding rectangle of face fringe based on position coordinates of chin, cheeks, and forehead; and then segmenting the corresponding image area from the image frame based on the boundary of the entire face area, for use as the entire face area image.

Alternatively, when determining the boundary of the entire face area based on the positions of the fringe facial keypoints, the minimum bounding rectangle of the face fringe may be expanded outward by a certain range, to ensure that all fringe face points are contained in the entire face area image.

Step 203: performing head pose estimation respectively based on the center face area image and the entire face area image.

The head pose estimation may be performed respectively based on the center face area image and the entire face area image, to obtain a piece of first head pose information estimated based on the center face area image and a piece of second head pose information estimated based on the entire face area image. Here, the piece of first head pose information and the piece of second head pose information are used for characterizing deviation angles of a head with respect to three angular coordinate axes of a standard three-dimensional face model, including a panning angle, a swing angle, and a nodding angle.

The head pose estimation may be performed as follows: first extracting two-dimensional keypoints of an image, and then finding out a pose difference between the standard three-dimensional face model and a three-dimensional face corresponding to the image, i.e., an estimated head pose information corresponding to the image, based on a mapping relationship between the two-dimensional keypoints and three-dimensional keypoints, and the standard three-dimensional face model.

Alternatively, the head pose estimation may be performed using a head pose estimation model based on a convolutional neural network, and the center face area image and the entire face area image are inputted into the head pose estimation model respectively, to obtain the corresponding piece of first head pose information and human head pose information. The model based on the convolutional neural network may be trained using a face image with annotated head pose information.

Step 204: generating a detection result on whether the target face object contained in the image frame is a fake face object based on a difference between a piece of first head pose information estimated based on the center face area image and a piece of second head pose information estimated based on the entire face area image.

The piece of first head pose information and the piece of second head pose information may be compared, and if the piece of first head pose information is consistent with the piece of second head pose information, then it is determined that the target face object in the image frame acquired in step 201 is a real face object.

Both the piece of first head pose information and the piece of second head pose information contain three pose angles of a head pose: the panning angle, the nodding angle, and the swing angle. When comparing the piece of first head pose information and the piece of second head pose information, the three angles of the piece of first head pose information and the piece of second head pose information may be correspondingly compared respectively, and differences of the three angles are accumulated for use as the difference between the piece of first head pose information and the piece of second head pose information, or an average difference of the three angles may be computed for use as the difference between the piece of first head pose information and the piece of second head pose information.

In some alternative implementations of the present embodiment, if it is determined that the difference between the piece of first head pose information and the piece of second head pose information exceeds a preset difference range, then determining that the target face object is the fake face object. The preset difference range may be a preset range of an accumulated value or average value of differences of the three angles, or a range of a difference value corresponding to each of the three angles respectively. Alternatively, the preset difference range may further be a preset angle threshold, and when the difference of at least one angle of the above differences of the panning angle, the nodding angle, or the swing angle exceeds the preset angle threshold, it is determined that the target face object is the fake face object. Here, the fake face object is a face object generated using a face swap technology, i.e., a face object in an image generated by replacing a human face in the image with a human face of another person using the face swap technology.

Alternatively, if it is determined that the difference between the piece of first head pose information and the piece of second head pose information does not exceed a preset difference range, then determining that the target face object is not the fake face object.

The current face swap technology pays attention to transfer and replacement of center face parts, such as eyes, eyebrows, lips, and nose. The face swap effect in the center face area is relatively verisimilar, but it is difficult to achieve accurate replacement for fringe areas, such as cheeks, and chin. Therefore, the fake face object generated after face swap has a stiff fringe. For a real face image that is not subjected to a face swap operation, a head pose estimated based on the center face area should be consistent with or be very slightly different from a head pose estimated based on the entire face area; and for an image of the fake face object generated through the face swap operation, the head pose estimated based on the center face area is greatly different from the head pose estimated based on the entire face area. The present embodiment achieves face swap detection by head pose estimation using the characteristic of the face swap technology that is difficult to accurately replace face fringe, and may effectively improve the accuracy and reliability of the detection result.

Figure 3:
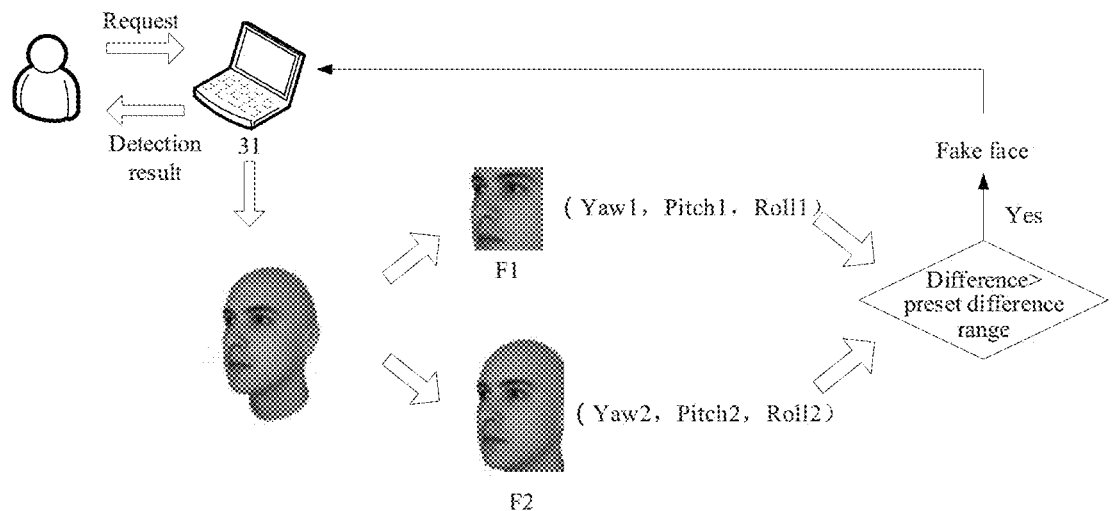
FIG. 3 is a schematic diagram of an application scenario of the method for detecting a face image according to an embodiment of the present disclosure.

Referring to FIG. 3, a schematic diagram of an application scenario of the method for detecting a face image according to an embodiment of the present disclosure is shown.

As shown in FIG. 3, after viewing a video presented by a terminal device 31, a user sends a request for detecting whether the viewed video is a face swap video generated through a face swap operation to the terminal device 31. The terminal device 31 may extract an image frame in the video based on the user request, perform facial keypoint detection on the image frame, segment a center face area image F1 and an entire face area image F2 of a target face object from the image frame, estimate a piece of first head pose information (Yaw1, Pitch1, Roll1) and a piece of second head pose information (yaw1, Pitch2, Roll2) respectively based on the center face area image and the entire face area image of the target face object, determine whether a difference between the piece of first head pose information (Yaw1, Pitch1, Roll1) and the piece of second head pose information (yaw1, Pitch2, Roll2) is greater than a preset difference range, and if the determining result is "YES," determine that the target face object in the image frame is a fake face object generated through the face swap operation. The terminal device 31 may return a detection result that the image frame in the video is a face swap image generated through the face swap operation to the user.

Figure 4:
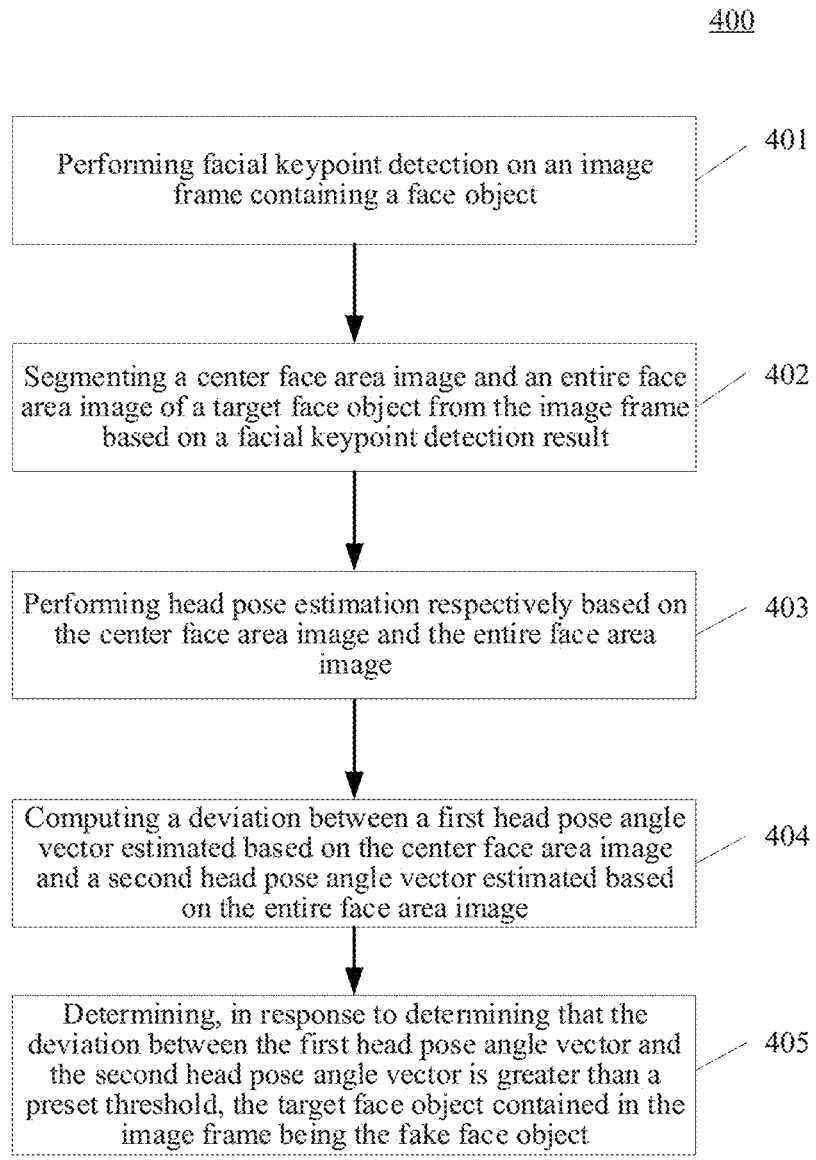
FIG. 4 is a flowchart of the method for detecting a face image according to another embodiment of the present disclosure.

Further referring to FIG. 4, a flowchart of the method for detecting a face image according to another embodiment of the present disclosure is shown. As show in FIG. 4, a process 400 of the method for detecting a face image includes:

Step 401: performing facial keypoint detection on an image frame containing a face object.

In the present embodiment, an executing body (e.g., the server shown in FIG. 1) of the method for detecting a face image may acquire the image frame containing the face object, for use as a to-be-detected face image. The executing body may extract the image frame containing the face object from a video, or receive the image frame containing the face object from other electronic devices, for use as the to-be-detected face image.

Step 402: segmenting a center face area image and an entire face area image of a target face object from the image frame based on a facial keypoint detection result.

The center face area image is a face image excluding a fringe face area. The entire face area image is a face image containing the fringe face area. The center face area is an area centered on a center face point containing eyes, nose, lips, and eyebrows, and the fringe face area is an area on face fringe, containing cheeks, forehead, chin, and the like. The entire face area contains the center face area and the fringe face area.

The executing body may detect any face object in the image frame as a target face object, or each face object in the image frame respectively as the target face object.

The center face area excluding face fringe and the entire face area image containing the face fringe and the center face area of the target face object may be determined based on positions of facial keypoints of the target face object in the facial keypoint detection result, and then the center face area and the entire face area of the target face object may be segmented from the image frame respectively, for use as the center face area image and the entire face area image of the target face object.

Step 401 and step 402 are consistent with step 201 and step 202 in the above embodiments, respectively. The above description of step 201 and step 202 may be further referred to for specific implementations of step 401 and step 402, respectively. The description will not be repeated here.

Step 403: performing head pose estimation respectively based on the center face area image and the entire face area image.

The head pose estimation may be performed respectively based on the center face area image and the entire face area image, to obtain a piece of first head pose information estimated based on the center face area image and a piece of second head pose information estimated based on the entire face area image.

Here, a head pose angle vector is employed to denote head pose information, i.e., the piece of first head pose information includes a first head pose angle vector, and the piece of second head pose information includes a second head pose angle vector. The head pose angle vector is a three-dimensional vector (Yaw, Pitch, Roll), where Yaw, Pitch and Roll represent a panning angle, a swing angle, and a nodding angle of a head pose with respect to a standard three-dimensional face model, respectively.

The head pose estimation may be performed as follows: first extracting two-dimensional keypoints of an image, and then finding out a pose angle difference between the standard three-dimensional face model and a three-dimensional face corresponding to the image, i.e., an estimated head pose angle corresponding to the image, based on a mapping relationship between the two-dimensional keypoints and three-dimensional keypoints, and the standard three-dimensional face model.

Alternatively, the head pose estimation may be performed using a head pose estimation model based on a convolutional neural network, and the center face area image and the entire face area image are inputted into the head pose estimation model respectively, to obtain the corresponding piece of first head pose information and human head pose information. The model based on the convolutional neural network may be trained using a face image with annotated head pose information.

Step 404: computing a deviation between a first head pose angle vector estimated based on the center face area image and a second head pose angle vector estimated based on the entire face area image.

The deviation between the first head pose angle vector and the second head pose angle vector may be computed, and specifically, an angle between the first head pose angle vector and the second head pose angle vector may be computed for use as the deviation between the first head pose angle vector and the second head pose angle vector; or a cosine similarity between the first head pose angle vector and the second head pose angle vector may be further computed for use as the deviation between the first head pose angle vector and the second head pose angle vector.

Step 405: determining, in response to determining that the deviation between the first head pose angle vector and the second head pose angle vector is greater than a preset threshold, the target face object contained in the image frame being the fake face object.

Then, whether a difference between the first head pose angle vector and the second head pose angle vector is greater than a preset threshold may be determined. For example, whether the angle between the first head pose angle vector and the second head pose angle vector is greater than a preset angle threshold may be determined. If the angle between the first head pose angle vector and the second head pose angle vector is greater than the preset angle threshold, then it is determined that the target face object is the fake face object. For another example, whether the cosine similarity between the first head pose angle vector and the second head pose angle vector is smaller than a preset similarity threshold may be determined. When the cosine similarity between the first head pose angle vector and the second head pose angle vector is smaller than the preset similarity threshold, it is determined that the deviation between the first head pose angle vector and the second head pose angle vector is greater than the preset threshold, and the target face object is the fake face object.

Here, the preset threshold may be obtained by training based on a large amount of sample data. The sample data may have annotated information of "fake face object" or "real face." The preset threshold may be set based on a statistical result of a difference between a first head pose angle and a second head pose angle corresponding to a real face image in the sample data, and based on a statistical result of a difference between a first head pose angle and a second head pose angle corresponding to a fake face image generated through face swap. For example, when it is statisticized that a cosine similarity between a first head pose angle and a second head pose angle corresponding to more than 90% of the real face images is greater than 0.8, and a cosine similarity between a first head pose angle and a second head pose angle corresponding to more than 90% of the fake face images is smaller than 0.8, the above preset threshold may be set as 0.8.

Alternatively, if the difference between the first head pose angle vector and the second head pose angle vector is not greater than the preset threshold, then determining that the target face object is not the fake face object. Since there may be a certain error in the head pose estimation, setting of the preset threshold may tolerate a certain estimation error, to avoid detecting the real face image to be the fake face image by mistake.

Since the face swap technology has a poor effect of replacing face fringe, there is a great difference between a head pose angle of fringe and a head pose angle of a center face area of a fake face object. The present embodiment may accurately quantify a difference between head poses by computing a difference between a head pose angle of a center face area image and a head pose angle of an entire face area image, thereby more accurately detecting whether a face object in an image frame is a fake face object.

Figure 5:
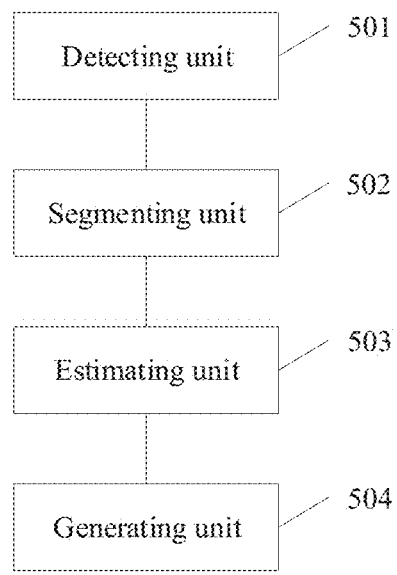
FIG. 5 is a schematic structural diagram of an apparatus for detecting a face image according to an embodiment of the present disclosure.

Further referring to FIG. 5, as an implementation of the method shown in the above figures, the present disclosure provides an embodiment of an apparatus for detecting a face image. The embodiment of the apparatus corresponds to the embodiment of the method shown in FIG. 2 and FIG. 3, and the apparatus may be specifically applied to various electronic devices.

As shown in FIG. 5, the apparatus 500 for detecting a face image of the present embodiment includes: a detecting unit 501, a segmenting unit 502, an estimating unit 503, and a generating unit 504. The detecting unit 501 is configured to perform facial keypoint detection on an image frame containing a face object; the segmenting unit 502 is configured to segment a center face area image and an entire face area image of a target face object from the image frame based on a facial keypoint detection result, the center face area image being a face image excluding a fringe face area, and the entire face area image being a face image containing the fringe face area; the estimating unit 503 is configured to perform head pose estimation respectively based on the center face area image and the entire face area image; and the generating unit 504 is configured to generate a detection result on whether the target face object contained in the image frame is a fake face object based on a difference between a piece of first head pose information estimated based on the center face area image and a piece of second head pose information estimated based on the entire face area image.

In some embodiments, the generating unit 504 may be further configured to: determine the target face object being the fake face object, in response to determining that the difference between the piece of first head pose information and the piece of second head pose information corresponding to a target face object contained in a plurality of consecutive image frames of a video exceeds a preset difference range.

In some embodiments, the piece of first head pose information includes a first head pose angle vector, and the piece of second head pose information includes a second head pose angle vector; and the generating unit 504 may be further configured to: compute a deviation between the first head pose angle vector and the second head pose angle vector; and determine, in response to determining that the deviation between the first head pose angle vector and the second head pose angle vector is greater than a preset threshold, the target face object contained in the image frame being the fake face object.

In some embodiments, the segmenting unit 502 may be further configured to segment the center face area image from the image frame by: determining a boundary of the center face area based on positions of keypoints of five sense organs in the facial keypoint detection result; and segmenting an image area within the boundary of the center face area from the image frame for use as the center face area image.

In some embodiments, the segmenting unit is further configured to segment the entire face area image from the image frame by: expanding the boundary of the center face area outward by a preset range, for use as a boundary of the entire face area; and segmenting a corresponding image area from the image frame based on the boundary of the entire face area, for use as the entire face area image.

In some embodiments, the segmenting unit is further configured to segment the entire face area image from the image frame by: determining a boundary of the entire face area based on positions of fringe facial keypoints in the facial keypoint detection result; and segmenting a corresponding image area from the image frame based on the boundary of the entire face area, for use as the entire face area image.

The apparatus 500 for detecting a face image according to the above embodiments of the present disclosure performs facial keypoint detection on an image frame containing a face object, segments a center face area image and an entire face area image of a target face object from the image frame based on a facial keypoint detection result, the center face area image being a face image excluding a fringe face area, and the entire face area image being a face image containing the fringe face area, performs head pose estimation respectively based on the center face area image and the entire face area image, and generates a detection result on whether the target face object contained in the image frame is a fake face object based on a difference between a piece of first head pose information estimated based on the center face area image and a piece of second head pose information estimated based on the entire face area image, to detect "face swap" using a characteristic that face fringe is stiff after face swap because it is difficult to replace the face fringe, thus effectively detecting a fake face image generated through face swap in an image or video.

Figure 6:
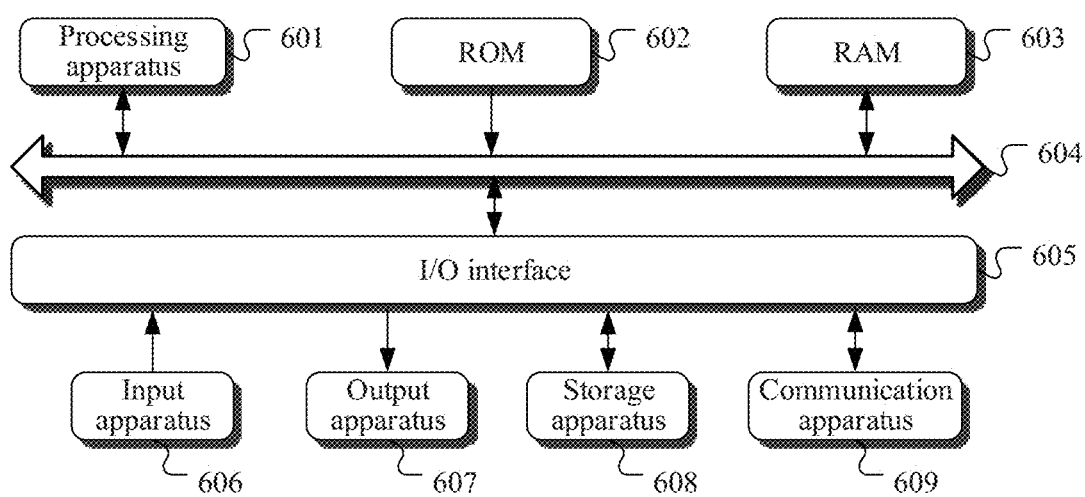
FIG. 6 is a schematic structural diagram of a computer system adapted to implement an electronic device of the embodiments of the present disclosure.

Referring to FIG. 6 below, a structural schematic diagram of an electronic device 600 (e.g., the server in FIG. 1) adapted to implement some embodiments of the present disclosure is shown. The electronic device shown in FIG. 6 is merely an example, and should not limit the functions and scope of use of the embodiments of the present disclosure.

As shown in FIG. 6, the electronic device 600 may include a processing apparatus (e.g., a central processing unit, or a graphics processor) 601, which may execute various appropriate actions and processes in accordance with a program stored in a read only memory (ROM) 602 or a program loaded into a random access memory (RAM) 603 from a storage apparatus 608. The RAM 603 further stores various programs and data required by operations of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including a touch screen, a touch pad, a keyboard, a mouse, a camera, a microphone, an accelerometer, a gyroscope, or the like; an output apparatus 607 including a liquid crystal displayer (LCD), a speaker, a vibrator, or the like; a storage apparatus 608 including a hard disk, or the like; and a communication apparatus 609. The communication apparatus 609 may allow the electronic device 600 to exchange data with other devices through wireless or wired communication. While FIG. 6 shows the electronic device 600 having various units, it should be understood that it is not necessary to implement or provide all of the units shown in the figure. More or fewer units may be alternatively implemented or provided. Each block shown in FIG. 6 may represent a unit, or represent a plurality of units as required.

In particular, according to some embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method as illustrated in the flow chart. In such an embodiment, the computer program may be downloaded and installed from a network via the communication apparatus 609, or be installed from the storage apparatus 608, or be installed from the ROM 602. The computer program, when executed by the processing apparatus 601, implements the functions as defined by the method of the embodiments of the present disclosure. It should be noted that the computer readable medium of the embodiment of the present disclosure may be a computer readable signal medium or a computer readable storage medium, or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: an electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the embodiments of the present disclosure, the computer readable storage medium may be any tangible medium containing or storing programs which may be used by, or used in combination with, a command execution system, apparatus or element. In the embodiments of the present disclosure, the computer readable signal medium may include data signal in the base band or propagating as parts of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium, including but not limited to: wire, an optical cable, a RF (radio frequency) medium etc., or any suitable combination of the above.

The computer readable medium may be included in the above electronic device; or a stand-alone computer readable medium without being assembled into the electronic device. The computer readable medium carries one or more programs. The one or more programs, when executed by the electronic device, cause the electronic device to: perform facial keypoint detection on an image frame containing a face object; segment a center face area image and an entire face area image of a target face object from the image frame based on a facial keypoint detection result, the center face area image being a face image excluding a fringe face area, and the entire face area image being a face image containing the fringe face area; perform head pose estimation respectively based on the center face area image and the entire face area image; and generate a detection result on whether the target face object contained in the image frame is a fake face object based on a difference between a piece of first head pose information estimated based on the center face area image and a piece of second head pose information estimated based on the entire face area image.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by software or hardware. The described units may also be provided in a processor, for example, described as: a processor including a detecting unit, a segmenting unit, an estimating unit, and a generating unit. The names of the units do not constitute a limitation to such units themselves in some cases. For example, the detecting unit may be further described as "a unit configured to perform facial keypoint detection on an image frame containing a face object."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for detecting a face image, comprising:
performing facial keypoint detection on an image frame containing a face object;
segmenting a center face area image and an entire face area image of a target face object from the image frame based on a facial keypoint detection result, the center face area image being a face image excluding a fringe face area, and the entire face area image being a face image containing the fringe face area;
performing head pose estimation respectively based on the center face area image and the entire face area image; and
generating a detection result on whether the target face object contained in the image frame is a fake face object based on a difference between a piece of first head pose information estimated based on the center face area image and a piece of second head pose information estimated based on the entire face area image,
wherein the piece of first head pose information comprises a first head pose angle vector, and the piece of second head pose information comprises a second head pose angle vector; and
the generating a detection result on whether the target face object contained in the image frame is a fake face object based on a difference between a piece of first head pose information estimated based on the center face area image and a piece of second head pose information estimated based on the entire face area image comprises:
computing a deviation between the first head pose angle vector and the second head pose angle vector; and
determining, in response to determining that the deviation between the first head pose angle vector and the second head pose angle vector is greater than a preset threshold, the target face object contained in the image frame being the fake face object.

2. The method according to claim 1, wherein the generating a detection result on whether the target face object contained in the image frame is a fake face object based on a difference between a piece of first head pose information estimated based on the center face area image and a piece of second head pose information estimated based on the entire face area image comprises:
determining the target face object being the fake face object, in response to determining that the difference between the piece of first head pose information and the piece of second head pose information corresponding to a target face object contained in a plurality of consecutive image frames of a video exceeds a preset difference range.

3. The method according to claim 1, wherein the segmenting a center face area image and an entire face area image of a target face object from the image frame based on a facial keypoint detection result comprises:
determining a boundary of the center face area based on positions of keypoints of five sense organs in the facial keypoint detection result; and
segmenting an image area within the boundary of the center face area from the image frame for use as the center face area image.

4. The method according to claim 3, wherein the segmenting a center face area image and an entire face area image of a target face object from the image frame based on a facial keypoint detection result further comprises:
expanding the boundary of the center face area outward by a preset range, for use as a boundary of the entire face area; and
segmenting a corresponding image area from the image frame based on the boundary of the entire face area, for use as the entire face area image.

5. The method according to claim 3, wherein the segmenting a center face area image and an entire face area image of a target face object from the image frame based on a facial keypoint detection result further comprises:
determining a boundary of the entire face area based on positions of fringe facial keypoints in the facial keypoint detection result; and
segmenting a corresponding image area from the image frame based on the boundary of the entire face area, for use as the entire face area image.

6. An apparatus for detecting a face image, comprising:
at least one processor; and
a memory storing instructions, wherein the instructions when executed by the at least one processor, cause the at least one processor to perform operations, the operations comprising:
performing facial keypoint detection on an image frame containing a face object;
segmenting a center face area image and an entire face area image of a target face object from the image frame based on a facial keypoint detection result, the center face area image being a face image excluding a fringe face area, and the entire face area image being a face image containing the fringe face area;

performing head pose estimation respectively based on the center face area image and the entire face area image; and generating a detection result on whether the target face object contained in the image frame is a fake face object based on a difference between a piece of first head pose information estimated based on the center face area image and a piece of second head pose information estimated based on the entire face area image, wherein the piece of first head pose information comprises a first head pose angle vector, and the piece of second head pose information comprises a second head pose angle vector; and the generating a detection result on whether the target face object contained in the image frame is a fake face object based on a difference between a piece of first head pose information estimated based on the center face area image and a piece of second head pose information estimated based on the entire face area image comprises:

computing a deviation between the first head pose angle vector and the second head pose angle vector; and determining, in response to determining that the deviation between the first head pose angle vector and the second head pose angle vector is greater than a preset threshold, the target face object contained in the image frame being the fake face object.

7. The apparatus according to claim 6, wherein the generating a detection result on whether the target face object contained in the image frame is a fake face object based on a difference between a piece of first head pose information estimated based on the center face area image and a piece of second head pose information estimated based on the entire face area image comprises:

determining the target face object being the fake face object, in response to determining that the difference between the piece of first head pose information and the piece of second head pose information corresponding to a target face object contained in a plurality of consecutive image frames of a video exceeds a preset difference range.

8. The apparatus according to claim 6, wherein the segmenting a center face area image and an entire face area image of a target face object from the image frame based on a facial keypoint detection result comprises:

determining a boundary of the center face area based on positions of keypoints of five sense organs in the facial keypoint detection result; and segmenting an image area within the boundary of the center face area from the image frame for use as the center face area image.

9. The apparatus according to claim 8, wherein the segmenting a center face area image and an entire face area image of a target face object from the image frame based on a facial keypoint detection result further comprises:

expanding the boundary of the center face area outward by a preset range, for use as a boundary of the entire face area; and segmenting a corresponding image area from the image frame based on the boundary of the entire face area, for use as the entire face area image.

10. The apparatus according to claim 8, wherein the segmenting a center face area image and an entire face area image of a target face object from the image frame based on a facial keypoint detection result further comprises:

determining a boundary of the entire face area based on positions of fringe facial keypoints in the facial keypoint detection result; and segmenting a corresponding image area from the image frame based on the boundary of the entire face area, for use as the entire face area image.

11. A non-transitory computer readable medium, storing a computer program thereon, wherein the program, when executed by a processor, causes the processor to perform operations, the operations comprising:

performing facial keypoint detection on an image frame containing a face object;

segmenting a center face area image and an entire face area image of a target face object from the image frame based on a facial keypoint detection result, the center face area image being a face image excluding a fringe face area, and the entire face area image being a face image containing the fringe face area;

performing head pose estimation respectively based on the center face area image and the entire face area image; and generating a detection result on whether the target face object contained in the image frame is a fake face object based on a difference between a piece of first head pose information estimated based on the center face area image and a piece of second head pose information estimated based on the entire face area image, wherein the piece of first head pose information comprises a first head pose angle vector, and the piece of second head pose information comprises a second head pose angle vector; and the generating a detection result on whether the target face object contained in the image frame is a fake face object based on a difference between a piece of first head pose information estimated based on the center face area image and a piece of second head pose information estimated based on the entire face area image comprises:

computing a deviation between the first head pose angle vector and the second head pose angle vector; and determining, in response to determining that the deviation between the first head pose angle vector and the second head pose angle vector is greater than a preset threshold, the target face object contained in the image frame being the fake face object.

12. The non-transitory computer readable medium according to claim 11, wherein the generating a detection result on whether the target face object contained in the image frame is a fake face object based on a difference between a piece of first head pose information estimated based on the center face area image and a piece of second head pose information estimated based on the entire face area image comprises:

determining the target face object being the fake face object, in response to determining that the difference between the piece of first head pose information and the piece of second head pose information corresponding to a target face object contained in a plurality of consecutive image frames of a video exceeds a preset difference range.

13. The non-transitory computer readable medium according to claim 11, wherein the segmenting a center face area image and an entire face area image of a target face object from the image frame based on a facial keypoint detection result comprises:
- determining a boundary of the center face area based on positions of keypoints of five sense organs in the facial keypoint detection result; and
- segmenting an image area within the boundary of the center face area from the image frame for use as the center face area image.

14. The non-transitory computer readable medium according to claim 13, wherein the segmenting a center face area image and an entire face area image of a target face object from the image frame based on a facial keypoint detection result further comprises:
- expanding the boundary of the center face area outward by a preset range, for use as a boundary of the entire face area; and
- segmenting a corresponding image area from the image frame based on the boundary of the entire face area, for use as the entire face area image.

15. The non-transitory computer readable medium according to claim 13, wherein the segmenting a center face area image and an entire face area image of a target face object from the image frame based on a facial keypoint detection result further comprises:
- determining a boundary of the entire face area based on positions of fringe facial keypoints in the facial keypoint detection result; and
- segmenting a corresponding image area from the image frame based on the boundary of the entire face area, for use as the entire face area image.

* * * * *